United States Patent
Ramos et al.

(10) Patent No.: US 7,382,154 B2
(45) Date of Patent: Jun. 3, 2008

(54) RECONFIGURABLE NETWORK ON A CHIP

(75) Inventors: Jeremy Ramos, Tampa, FL (US); Scott D. Stackelhouse, Clearwater, FL (US); Ian A. Troxel, Gainesville, FL (US)

(73) Assignee: Honeywell International Inc., Morristown, NJ (US)

( * ) Notice: Subject to any disclaimer, the term of this patent is extended or adjusted under 35 U.S.C. 154(b) by 123 days.

(21) Appl. No.: 11/242,509

(22) Filed: Oct. 3, 2005

(65) Prior Publication Data
US 2007/0075734 A1 Apr. 5, 2007

(51) Int. Cl.
*H03K 19/173* (2006.01)
(52) U.S. Cl. .......................................... 326/38; 326/41
(58) Field of Classification Search ............ 326/37–41, 326/82
See application file for complete search history.

(56) References Cited

U.S. PATENT DOCUMENTS

| | | | |
|---|---|---|---|
| 6,483,342 B2 * | 11/2002 | Britton et al. | 326/39 |
| 6,531,888 B2 * | 3/2003 | Abbott | 326/38 |
| 6,573,748 B1 * | 6/2003 | Trimberger | 326/38 |
| 6,781,226 B2 * | 8/2004 | Huppenthal et al. | 257/686 |
| 7,076,595 B1 * | 7/2006 | Dao et al. | 710/317 |
| 2005/0023656 A1 | 2/2005 | Leedy | |

FOREIGN PATENT DOCUMENTS

| EP | 1443417 | 8/2004 |
|---|---|---|
| WO | 2004053717 | 6/2004 |

* cited by examiner

*Primary Examiner*—Don Le
(74) *Attorney, Agent, or Firm*—Fogg & Powers LLC

(57) ABSTRACT

An architecture for a reconfigurable network that can be implemented on a semiconductor chip is disclosed, which includes a hierarchical organization of network components and functions that are readily programmable and highly flexible. Essentially, a reconfigurable network on a chip is disclosed, which includes aspects of reconfigurable computing, system on a chip, and network on a chip designs. More precisely, a reconfigurable network on a chip includes a general purpose microprocessor for implementing software tasks, a plurality of on-chip memories for facilitating the processing of large data structures as well as processor collaboration, a plurality of reconfigurable execution units including self-contained, individually reconfigurable programmable logic arrays, a plurality of configurable system interface units that provide interconnections between on-chip memories, networks or buses, an on-chip network including a network interconnection interface that enables communication between all reconfigurable execution units, configurable system interface units and general purpose microprocessors, a fine grain interconnect unit that gathers associated input/output signals for a particular interface and attaches them to a designated system interface resource, and a plurality of input/output blocks that supply the link between an on-chip interface resource and a particular external network or device interface. Advantageously, the network minimizes the configuration latency of the reconfigurable execution units and also enables reconfiguration on-the-fly.

20 Claims, 3 Drawing Sheets

RECONFIGURABLE NETWORK ON A CHIP

FIELD OF THE INVENTION

The present invention relates generally to the network processing field, and more specifically, but not exclusively, to an architecture for a reconfigurable network that can be implemented on a semiconductor chip.

BACKGROUND OF THE INVENTION

The desire by mission planners to implement viable space communication infrastructures that can facilitate the deployment of next-generation space-based networks creates numerous design challenges for today's spacecraft system engineers. These design challenges are compounded by increasingly demanding space applications and increased mission requirements, and also significant pressure to minimize the overall system costs. Generally, the trend is to implement less costly space communication systems while striving to transport more data to and from user applications. In this regard, a major problem encountered by system designers is that the existing space system architectures and associated design approaches fall short in meeting all of the new design and cost requirements being imposed. Therefore, a new space system architecture and design approach are needed that can provide an optimal balance in meeting existing and future space system design and mission requirements, especially in terms of cost, performance, reliability, flexibility, power consumption and weight.

A current trend in the space industry is towards a modular commercial off-the-shelf design approach. However, the use of off-the-shelf components (e.g., for payload processors, mission specific sensors, communication subsystems, etc.) from numerous different vendors creates a significant interface design problem that has not yet been adequately addressed. For example, the use of different interfaces between the vendors' components reduces the overall flexibility of the systems involved, and leads to increased non-recurring engineering costs (in terms of financial expenses, power consumption and weight). Also, this approach presents a significant design challenge due to rapidly changing standards, the scarcity of space-worthy off-the-shelf interface components, and the basic inflexibility of the network solutions that are available today. In this regard, refer to FIG. 1, which depicts a typical spacecraft system architecture for scientific applications that illustrates the above-described interface problems with the current off-the-shelf design approach.

FIG. 1 depicts a block diagram of a typical architecture for a state-of-the-art spacecraft system 100 using a conventional commercial off-the-shelf design approach, which includes a sensor suite (SS) subsystem 102, a payload data processor (PDP) subsystem 104, and a spacecraft control processor (SCP) subsystem 106. The SS subsystem 102 includes a plurality of sensors 108a-108d, the PDP subsystem 104 includes a plurality of payload data processors 110a-110c, and the SCP subsystem 106 includes a plurality of spacecraft control processors 112a-112c. As illustrated by this example architecture, the current design approach is to use standard point-to-point interfaces between the components of the SS subsystem 102 and PDP subsystem 104. Thus, interfaces 114a-114d are implemented as standard point-to-point interfaces using IEEE 1394 and 1355 high-speed serial links. Additionally, payload data processors 110a-110c in PDP subsystem 104 are implemented as commercial off-the-shelf computer processors, which are interconnected by a standard Compact Peripheral Component Interconnect (cPCI) backplane bus 116. Note that, as illustrated by this example architecture, a conventional solution for a typical SS-PDP interface is to implement one interface per sensor-computer pair.

Spacecraft system 100 depicted in FIG. 1 also includes two major interfaces 118, 120 that interconnect the PDP and SCP subsystems 104, 106. For this example, interface 120 is implemented with an IEEE 1394 serial link between SCP processor 112a and PDP processor 110c so as to exchange control information. Alternatively, interface 120 may be implemented with an IEEE 1355 serial link. Control information is also exchanged between processors 112a and 112b in SCP subsystem 106 using an IEEE 1394 serial link 122. Interface 118 provides data downlink, uplink, and cross-link transmission capabilities using a standard network communication protocol (e.g., ATM). At this point, it is important to note that all of the above-described system interconnects are defined early on in the design cycle, and that specific design remains fixed and inflexible throughout the life of the system involved. Consequently, such design inflexibility severely restricts a user's ability to redistribute data during missions, and also limits the types of applications that can be implemented.

In the types of systems illustrated by FIG. 1, software (rather than hardware) is used for management of the various protocols used. However, implementing such a software/hardware tradeoff leads to additional software development costs and an overall loss of computing power. Thus, there is a pressing need to develop a flexible network infrastructure that can facilitate the interconnection of system components using disparate interface standards, without also incurring an increase in processing overhead, design costs, and/or project risk.

Another problem that exists in this field is that significant advances in chip technologies and wire speeds in the commercial sector are driving a need for faster packet-processing devices, and protocols have become diversified to a great extent. However, two basic design philosophies have evolved to solve this problem. One approach emphasizes increased design flexibility, and the other emphasizes increased processing speed. For example, one such design approach is to use a "general purpose process" to handle network traffic in order to increase flexibility, but this increase comes at the expense of speed. A second approach uses Application-Specific Integrated Circuits (ASICs) for network traffic processing functions in order to increase speed, but this increase comes at the expense of flexibility. Ultimately, the significant increases in link speeds make "wire speed" processing unattainable with today's "general purpose processor" solutions. Also, the fixed nature of ASICs makes them too inflexible for many applications. However, vendors of processing system components (e.g., routing switches, edge switches, network interface cards, etc.) now realize that it is not enough to simply optimize their products for either flexibility or speed alone, because unless their products can provide the best features of both approaches, they will be incapable of meeting future market demands. Therefore, in order to meet these and other similar challenges, certain designers have been working to develop network devices (the field of "Network Processors") that should merge the best features of both flexibility and speed.

Nevertheless, although the developers of today's Network Processor designs have achieved some successes in solving certain flexibility versus speed optimization problems, there are still a number of significant problems to be resolved. For example, the existing Network Processor architectures rely on a conventional technique of merging a "general purpose processor" with relatively costly non-programmable ASICs. However, improvements in reconfigurable computing techniques using field-programmable gate arrays (FPGAs) offer additional flexibility for future Network Processor architectures, by providing a custom-made hardware solution that can be reconfigured and adapted for future in-space mission needs. Notwithstanding such improvements, a major drawback of this approach is that there is an inherent flaw in the design of FPGAs that significantly limits the amount of flexibility that can be obtained. For example, today's FPGA devices are composed of a large number of tightly-coupled, fine-grained programmable resources. However, the tightly-coupled nature of the programmable fabric of these FPGAs makes them fall far short of the goal of implementing all of the concepts of the reconfigurable computing paradigm, because the current FPGA designs are not scalable for implementing coarse-grained applications (e.g., in terms of physical interconnections and design engineer effort). Therefore, it would be advantageous to provide a network architecture that can be used, for example, for space-based applications, which efficiently integrates all of the elements required by the reconfigurable computing paradigm and provides an optimal balance between flexibility and speed. As described in detail below, the present invention provides a novel reconfigurable network that can be implemented on a chip, which resolves the above-described interface design problems and other related problems.

SUMMARY OF THE INVENTION

The present invention provides an architecture for a reconfigurable network that can be implemented on a chip, which includes a hierarchical organization of components and functions that are readily programmable and highly flexible. In accordance with a preferred embodiment of the present invention, a reconfigurable network on a chip is provided, which includes aspects of reconfigurable computing, system on a chip, and network on a chip designs. More precisely, a reconfigurable network on a chip includes a plurality of general purpose microprocessors for implementing software tasks, a plurality of on-chip memories for facilitating the processing of large data structures as well as processor collaboration, a plurality of reconfigurable execution units including self-contained, individually reconfigurable programmable logic arrays, a plurality of configurable system interface units that provide interconnections between on-chip memories, networks or buses, an on-chip network including a network interconnection interface that enables communication between all reconfigurable execution units, configurable system interface units and general purpose microprocessors, a fine grain interconnect unit that gathers associated input/output signals for a particular interface and attaches them to a designated system interface resource, and a plurality of input/output blocks that supply the link between an on-chip interface resource and a particular external network or device interface. Advantageously, the present invention provides a reconfigurable network that can be implemented on a chip, which minimizes the configuration latency of the reconfigurable execution units and also enables reconfiguration on-the-fly.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
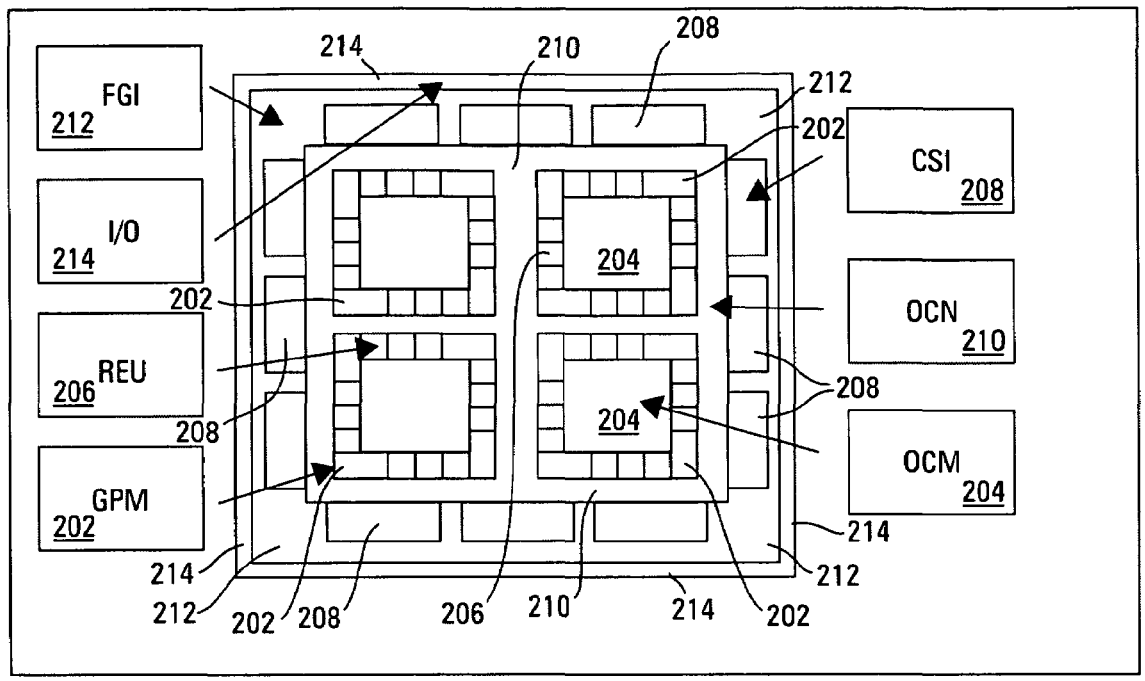
FIG. 2 depicts a block diagram of an example architecture for a reconfigurable network, which can be used to implement a preferred embodiment of the present invention.

With reference again to the figures, FIG. 2 depicts a block diagram of an example architecture for a reconfigurable network 200, which can be used to implement a preferred embodiment of the present invention. As shown, for this example embodiment, reconfigurable network 200 in FIG. 2 is arranged in a particular configuration as a plurality of network processing resources on a semiconductor chip. However, it should be understood that the present invention is not intended to be so limited and can also include within its scope any suitable arrangement and/or number of the network processing resources shown. The actual number and arrangement of the network processing resources is dictated to a great extent by the technology of the target semiconductor processes or applications involved. Also, the present invention is not intended to be limited only to a semiconductor chip. As such, for this example embodiment, reconfigurable network 200 includes sixteen general purpose microprocessors 202, four on-chip memory units 204, forty-eight reconfigurable execution units 206, twelve configurable system interface units 208, an on-chip network 210, a fine grain interconnect unit 212, and a plurality of input/output blocks 214.

More precisely, as shown in FIG. 2, reconfigurable network 200 includes four microprocessor units 202 and twelve reconfigurable execution units 206 associated with, and arranged in close proximity to, each on-chip memory unit 204. Each microprocessor unit 202 can be, for example, an embedded microprocessor that functions primarily to implement software tasks and includes integrated local memory and also suitable interfaces to an associated on-chip memory unit 204 and the on-chip network 210. Preferably, each on-chip memory unit 204 is a multi-port memory accessible to a subset of the processing resources involved. Thus, each on-chip memory unit 204 provides a shared memory resource (shared, in this example, by four microprocessors) for memory intensive applications, which facilitates the processing of large data structures and enhances collaboration between the microprocessors involved.

Additionally, as shown in FIG. 2, there are three reconfigurable execution units 206 arranged between each two consecutive general purpose microprocessor units 202. For this example embodiment, each reconfigurable execution unit 206 can be implemented as a self-contained, individually reconfigurable programmable logic array. Also, each reconfigurable execution unit 206 includes hard-wired, dedicated interfaces to an associated on-chip memory unit 204 and the on-chip network 210. For example, in operation, a single task can be targeted for execution to a specific reconfigurable execution unit 206 using a technique similar to that used for targeting an FPGA. As an option, two or all three of the neighboring reconfigurable execution units 206 may be combined to form a larger programmable array, which is advantageous if an application is too large for a single reconfigurable execution unit and/or the application is not easily partitioned into subtasks.

The on-chip network 210 (e.g., represented as the rectangular region that encompasses the four sets of on-chip memory units with their associated general purpose microprocessors and reconfigurable execution units) provides a network interconnection interface that enables communications between all of the reconfigurable execution units 206, configurable system interface units 208, and general purpose microprocessor units 202 in reconfigurable network 200. The configurable system interface units 208 provide the basic capabilities needed to interface to any on-chip memory unit 204, an on-chip network 210, or a communication/data bus. Thus, the configurable system interface units 208 are fully configurable system resources that are adaptable to handle different network protocols and can also provide other interface flexibility in this regard.

The fine grain interconnect unit 212 (e.g., represented as the rectangular region that encompasses the on-chip network 210 and the twelve configurable system interface units 208) provides the first interconnect layer encountered within reconfigurable network 200. For this example embodiment, the fine grain interconnect unit 212 is composed of a plurality of bit-level programmable routing resources. As such, the primary function of the fine grain interconnect unit 212 is to gather associated input/output signals for a particular interface, and attach those associated input/output signals to a designated resource of a configurable system interface unit 208.

Each of the input/output blocks 214 (e.g., represented as the dark rectangular region that encompasses the fine grain interconnect 212) is composed of an external pin interface (e.g., I/O pad), one or more registers, one or more tri-state buffers, and other associated support logic devices. Thus, the primary function of each input/output block 214 is to supply a suitable link between an on-chip interface resource and an interface for a particular external (off-chip) network, system or device. Advantageously, in this regard, many of the standards implemented for the physical layer can be integrated into the input/output blocks 214, thereby reducing the need for external components.

Figure 3:
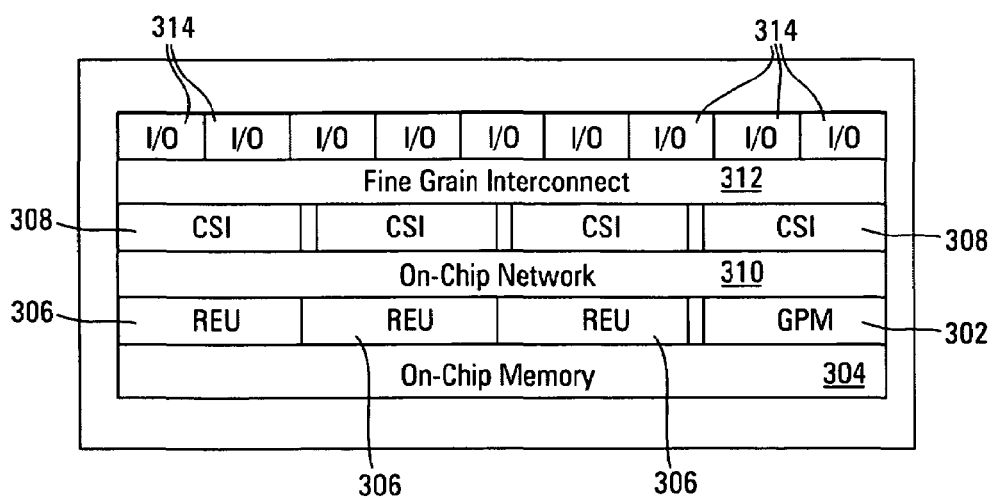
FIG. 3 depicts a diagram that illustrates the high programmability and flexibility of the functions provided by the hierarchical organization of the example reconfigurable network shown in FIG. 2.

FIG. 3 depicts a diagram that illustrates the high programmability and flexibility of the functions provided by the hierarchical organization of the example reconfigurable network 200 shown in FIG. 2. For example, the hierarchical layout 300 shows the highest level in the hierarchy as the input/output layer 314, which provides access to the reconfigurable network 200 by external (e.g., off-chip) networks, systems or devices. The next highest level in the hierarchy is the fine grain interconnect layer 312, which gathers associated input/output signals for a particular interface, and attaches those input/output signals to a designated resource in the next layer of the hierarchy (e.g., configurable system interface 308). The next lower level in the hierarchy is the on-chip network layer 310, which provides a network interconnection interface that enables communications between all of the reconfigurable execution units 306 and general purpose microprocessors 302 in the next (lower level) layer, and the configurable system interface units 308 in the layer above. The lowest level in the hierarchy shown is the on-chip memory layer 304, which provides a shared memory resource (e.g., for four microprocessors 302 at the next higher level).

In summary, the example reconfigurable network 200 in FIG. 2 is depicted as a two-dimensional architectural layout of a reconfigurable network on a chip, which includes sixteen processing clusters (e.g., associated with general purpose microprocessors 202) and twelve configurable system interfaces (e.g., configurable system interface units 208). However, it should be understood that the arrangement and number of such resources used in an actual implementation of a reconfigurable network on a chip will be dictated by the actual process technology involved. Preferably, a CMOS process should be used to implement a commercial version of the reconfigurable network on a chip, because a target space environment may require a significant amount of radiation tolerance. However, for a more extreme space environment, a Silicon-On-Insulator (SOI) process may be used to provide increased radiation hardening for the reconfigurable network on a chip. Additionally, with respect to attaining another important goal, power consumption of the reconfigurable network on a chip can be reduced significantly by adopting a Globally Asynchronous Locally Synchronous (GALS) processing approach, powering-off idle resources, and limiting the use of high frequency clocks.

As discussed earlier, two major goals of a reconfigurable network on a chip are to reduce the configuration latency (delays) of the reconfigurable execution units and enable on-the-fly reconfiguration. In accordance with the present invention, a reconfigurable network on a chip (e.g., reconfigurable network 200) achieves these goals by using a novel hierarchy of configuration control and on-chip configuration caches, as shown in the example architecture of a configuration control system 400 depicted in FIG. 4. In accordance with a preferred embodiment of the present invention, configuration control system 400 includes a device-level configuration control unit 402, which is at the top level of the hierarchy shown and controls the overall configuration of a reconfigurable network on a chip (e.g. reconfigurable network 200 shown in FIG. 2 and implemented on a chip). The device-level configuration control unit 402 presents a single configuration interface to an external (e.g., off-chip) interface 404 and can accept a number of different configuration setting and configuration control schedules via, for example, an interface associated with a non-volatile memory device (not shown) or the on-chip network 210 from a configurable system interface unit 208. Thus, the non-volatile memory device (e.g., ROM, PROM, EEPROM, etc.) provides a boot-strap configuration set to be used at power-up. Once the device-level configuration control unit 402 is powered-up and on-line, it can accept updates to the configurations involved (e.g., via one or more of the configurable system interface units 208), and if necessary, also update the configuration set image stored in the non-volatile memory device.

Configuration control system 400 also includes a plurality of cluster configuration control units 406a, 406b, which are at the second level of the hierarchy shown. Notably, although only two cluster configuration control units 406a, 406b are shown, the present invention is not intended to be so limited and can include additional cluster configuration control units depending on the number of processing clusters being used. For example, in a preferred embodiment of the present invention, a single cluster configuration control unit 406a or 406b is used for each processing cluster in the reconfigurable network 200 shown in FIG. 2. Consequently, for that example embodiment, there are sixteen processing clusters (centered on sixteen general purpose microprocessor units 202 and their associated reconfigurable execution units 206), and therefore, there would be sixteen cluster configuration control units for the embodiment depicted in FIG. 2. In any event, each cluster configuration control unit 406a, 406b is primarily responsible for the configuration of that processing cluster's reconfigurable execution units 408a, 408b, and for loading programs for execution by that processing cluster's general purpose microprocessor 410a, 410b. A secondary function of each cluster configuration control unit 406a, 406b is to manage the configuration schedule for the associated processing cluster involved. Also, each cluster configuration control unit 406a, 406b is responsible for maintaining a local cache 412a, 412b of configurations for the associated set of reconfigurable execution units 408a, 408b involved.

Figure 4:
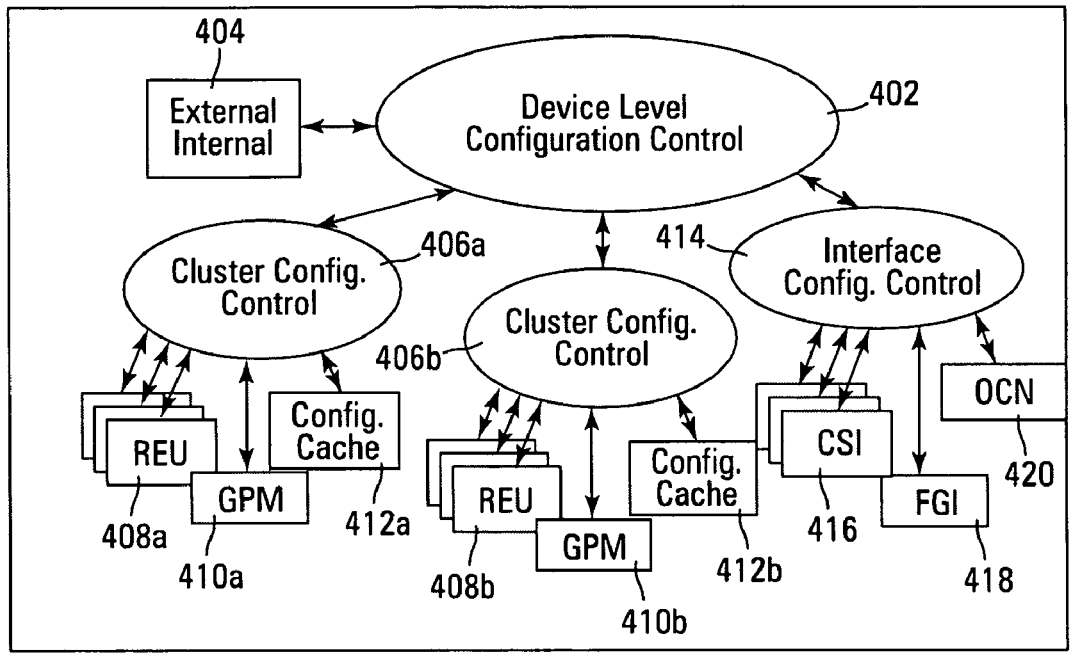
FIG. 4 depicts an architecture for an example configuration control system, which can be used to implement a preferred embodiment of the present invention.

Additionally, configuration control system 400 includes an interface configuration control unit 414, which is also at the second level of the configuration control hierarchy shown in FIG. 4. As such, interface configuration control unit 414 functions primarily to administer the configuration of the configurable system interface units 416 (e.g., elements 208 in FIG. 2), the fine grain interconnect 418 (e.g., element 212), and the on-chip network 420 (e.g., element 210). Notably, for this embodiment, a local configuration cache is not needed with interface configuration control unit 414, because of the relatively low reconfiguration frequency of the resources managed by the interface configuration control unit 414. In any event, in addition to the schedule-directed configuration capabilities provided by the present invention, the interface configurations can also be triggered via directives conveyed over the on-chip network 420. These directives can originate in resources external (e.g., off-chip) to the reconfigurable network, or from internal (e.g., on-chip) processing elements. Advantageously, this feature provided by the present invention facilitates the implementation of adaptive applications that can autonomously reconfigure the system or network involved.

Figure 1:
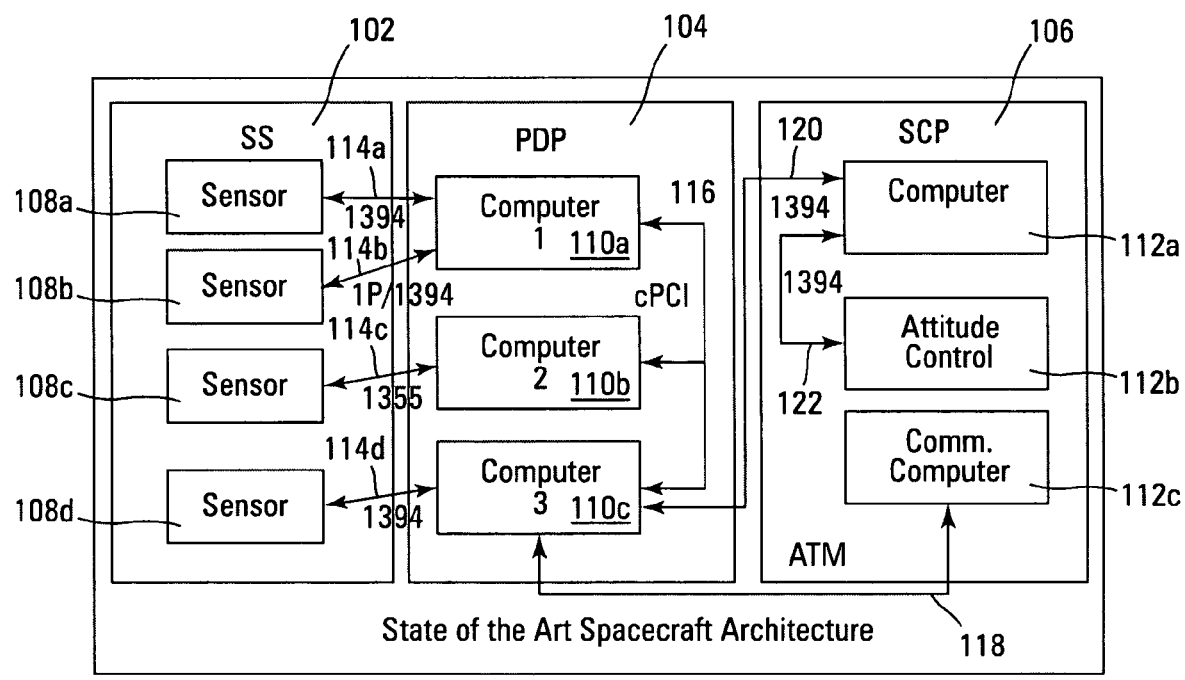
FIG. 1 depicts a block diagram of a typical architecture for a state of the art spacecraft system using a conventional commercial off-the-shelf design approach.
Figure 5:
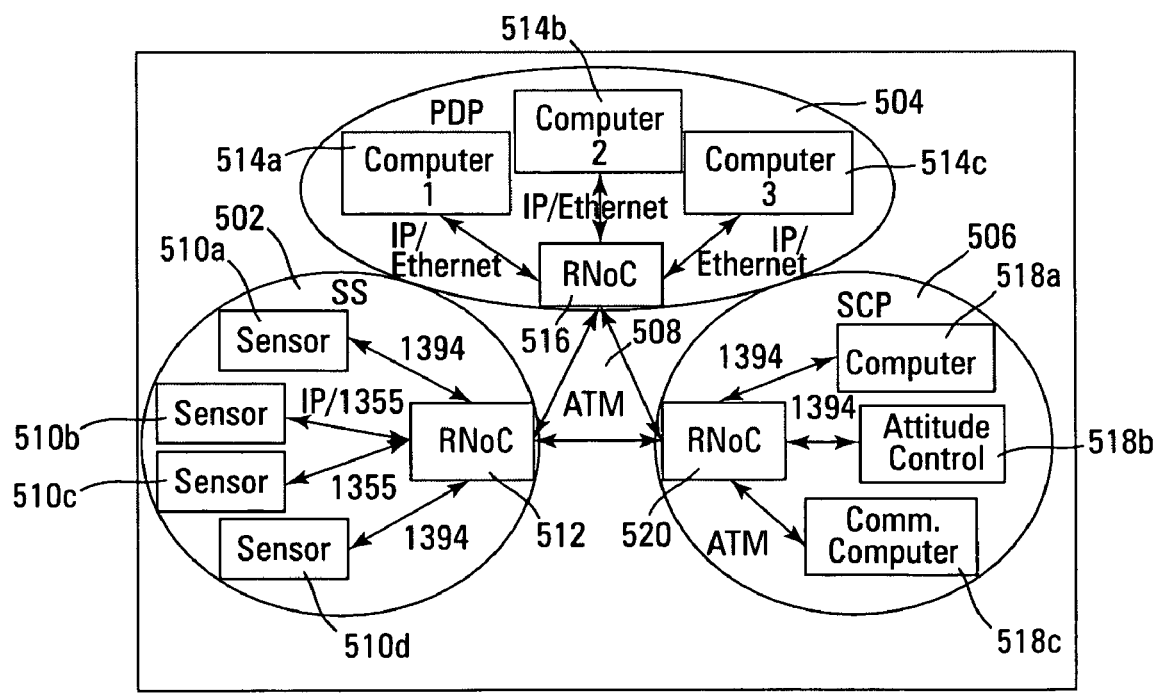
FIG. 5 depicts a diagram of an example spacecraft system that can be used to implement a preferred embodiment of the present invention.

The above-described flexibility versus speed problems of the existing network processor architectures and designs are resolved to a significant extent by the reconfigurable network of the present invention, by incorporating reconfigurable execution units that can function as network bridges or routers capable of bridging between the interfaces involved. Thus, the present invention provides a flexible, heterogeneous network processor system that can be implemented, for example, on a semiconductor chip. In this regard, FIG. 5 depicts a diagram of an example spacecraft system 500 that can be used to implement a preferred embodiment of the present invention. In particular, system 500 illustrates how the present invention resolves the interface, flexibility and speed problems encountered by the existing network processing and spacecraft system architectures (e.g., as exemplified by the spacecraft system shown in FIG. 1), and provides efficient communications between all of the components within the entire spacecraft involved.

For this example embodiment, spacecraft system 500 includes an SS subsystem 502, a PDP subsystem 504, and an SCP subsystem 506. The three subsystems 502, 504 and 506 are interconnected by an ATM network 508. Notably, in accordance with the present invention, a plurality of sensors 510a-510d in SS subsystem 502 using various interface protocols are interconnected with the components of subsystems 504 and 506 (via ATM network 508) by a reconfigurable network 512. For this example embodiment, reconfigurable network 512 is implemented on a semiconductor chip. Similarly, a plurality of computer processors 514a-510c in PDP subsystem 504 using IP/Ethernet interface protocols are interconnected with the components of subsystems 502 and 506 (via ATM network 508) by a reconfigurable network 516. Also, a plurality of spacecraft control processors 518a-518c in SCP subsystem 506 using various interface protocols are interconnected with the components of subsystems 502 and 504 (via ATM network 508) by a reconfigurable network 520. Thus, in accordance with teachings of the present invention, the payload data processor computers in subsystem 504 can communicate using a localized IP/Ethernet network, and in each of subsystems 502 and 506, a suitable mix of interfaces can be used to create localized heterogeneous networks for communications between the components involved.

In sum, as illustrated by FIG. 5, the present invention provides a powerful new platform for distributed spacecraft processing applications, spacecraft payload networks, and space-based backbone infrastructures. Also, the present invention provides a suitable architecture for implementing other high performance applications with, for example, on-the-fly reconfigurable network on a chip reconfigurations, pipelining using reconfigurable execution units, and embedded general purpose microprocessors with their attendant advantages. For example, an embodiment of the reconfigurable network on a chip can also be used for signal processing, control, image processing, and communications applications. As such, a reconfigurable network on a chip can be used as a stand-alone processor or combined with a plurality of reconfigurable network devices to form a multiprocessing system. Thus, the present invention provides a reconfigurable, reprogrammable, heterogeneous system that can dynamically adapt to changing mission requirements with flexible resources in a failure-prone environment at a limited cost. Also, the present invention provides a reconfigurable network design that can significantly reduce the costs and development times of spacecraft payloads, by reducing the integration and development times of the heterogeneous interfaces and networks used, and reducing the overall size and mass of the systems involved.

It is important to note that while the present invention has been described in the context of a fully functioning reconfigurable network, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular reconfigurable network.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A reconfigurable network on a semiconductor chip, comprising:
   a plurality of memory units;
   a plurality of processing units disposed on the semiconductor chip, coupled to said plurality of memory units;
   a plurality of reconfigurable execution units coupled to said plurality of processing units;
   a network interface unit coupled to said plurality of reconfigurable execution units and said plurality of processing units;
   a plurality of configurable system interface units coupled to said network interface unit; and
   a fine grain interconnect unit coupled to said plurality of configurable system interface units.

2. The reconfigurable network of claim 1, further comprising:
   at least one input/output unit coupled to said fine grain interconnect unit.

3. The reconfigurable network of claim 1, wherein the reconfigurable network is disposed on at least one of a CMOS chip and an SOI chip.

4. The reconfigurable network of claim 1, wherein said plurality of memory units comprises a plurality of volatile memory devices, said plurality of processing units comprises four microprocessors, said plurality of reconfigurable execution units comprises twelve reconfigurable execution units, and said plurality of configurable system interface units comprises twelve configurable system interface units.

5. The reconfigurable network of claim 1, wherein said plurality of processing units comprises a plurality of embedded microprocessors.

6. The reconfigurable network of claim 1, wherein said network interface unit comprises an on-chip network operable to interconnect said plurality of reconfigurable interface units, said plurality of configurable system interface units, and said plurality of processing units for data communications therebetween.

7. The reconfigurable network of claim 1, wherein said plurality of reconfigurable execution units comprises a plurality of programmable logic arrays.

8. The reconfigurable network of claim 1, wherein said plurality of configurable system interface units comprises a plurality of configurable data communications interfaces operable to interconnect at least two of a memory unit, a network and a bus for data communications therebetween.

9. The reconfigurable network of claim 1, wherein said fine grain interconnect unit comprises at least one programmable routing device.

10. The reconfigurable network of claim 1, further comprising:
    at least one input/output unit coupled to said fine grain interconnect unit, wherein said at least one input/output unit comprises at least one input/output pad, at least one register, and at least one buffer.

11. A reconfigurable network on a semiconductor chip, comprising:
    a plurality of means for storing data;
    a plurality of processor means for processing said data, disposed on the semiconductor chip and coupled to said plurality of means for storing data;
    a plurality of reconfigurable execution means for executing a plurality of configuration instructions, coupled to said plurality of means for storing data;
    network interface means for interconnecting said plurality of processor means for processing and said plurality of reconfigurable execution means; and
    a plurality of configurable system interface means for interconnecting said network interface means with a fine grain interconnect means, said fine grain interconnect means for receiving a plurality of associated input/output signals and coupling said plurality of associated input/output signals to said plurality of configurable system interface means.

12. A method for increasing the configuration adaptability and processing speed of a network on a chip, comprising the steps of:
    coupling a plurality of memory units on the chip to a plurality of processing units on the chip;
    coupling a plurality of reconfigurable execution units on the chip to said plurality of processing units;
    coupling a network interface unit on the chip to said plurality of reconfigurable execution units;
    coupling a plurality of configurable system interface units on the chip to said network interface unit; and
    coupling a fine grain interconnect unit on the chip to said plurality of configurable system interface units.

13. The method of claim 12, further comprising the step of:
    coupling at least one input/output unit on the chip to said fine grain interconnect unit.

14. The method of claim 12, wherein the chip is a CMOS chip.

15. The method of claim 12, wherein the chip is an SOI chip.

16. The method of claim 12, wherein said plurality of memory units comprises a plurality of volatile memory devices, said plurality of processing units comprises four microprocessors, said plurality of reconfigurable execution units comprises twelve reconfigurable execution units, and said plurality of configurable system interface units comprises twelve configurable system interface units.

17. The method of claim 12, wherein said plurality of processing units comprises a plurality of embedded microprocessors.

18. The method of claim 12, wherein the coupling steps further comprise interconnecting said plurality of reconfigurable interface units, said plurality of configurable system interface units, and said plurality of processing units for data communications therebetween.

19. The method of claim 12, wherein said plurality of reconfigurable execution units comprises a plurality of programmable logic arrays.

20. The method of claim 12, wherein said fine grain interconnect unit comprises at least one programmable routing device.

* * * * *

UNITED STATES PATENT AND TRADEMARK OFFICE
CERTIFICATE OF CORRECTION

| | | |
|---|---|---|
| PATENT NO. | : 7,382,154 B2 | |
| APPLICATION NO. | : 11/242509 | |
| DATED | : June 3, 2008 | |
| INVENTOR(S) | : Ramos et al. | |

It is certified that error appears in the above-identified patent and that said Letters Patent is hereby corrected as shown below:

At Claim 10, Column 9, Line 57, insert the term --tri-state-- between the words "one" and "buffer."

Signed and Sealed this

Eighteenth Day of August, 2009

David J. Kappos
*Director of the United States Patent and Trademark Office*